US012501117B1

United States Patent
Lefeuvre

(10) Patent No.: US 12,501,117 B1
(45) Date of Patent: Dec. 16, 2025

(54) ON-DEMAND MULTI-AUDIO BROADCASTING

(71) Applicant: Amazon Technologies, Inc., Seattle, WA (US)

(72) Inventor: Florian Lefeuvre, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 18/536,797

(22) Filed: Dec. 12, 2023

(51) Int. Cl.
*H04N 21/81* (2011.01)
*H04N 21/442* (2011.01)

(52) U.S. Cl.
CPC ... *H04N 21/8106* (2013.01); *H04N 21/44209* (2013.01)

(58) Field of Classification Search
CPC ............ H04N 21/8106; H04N 21/44209
USPC ............................................. 709/229
See application file for complete search history.

(56) References Cited

U.S. PATENT DOCUMENTS

| | | | |
|---|---|---|---|
| 6,674,745 B1 | 1/2004 | Schuster et al. |
| 10,887,646 B2 | 1/2021 | Zane et al. |
| 11,082,457 B1 | 8/2021 | Oliver et al. |
| 2010/0063815 A1 | 3/2010 | Cloran et al. |
| 2011/0060804 A1 | 3/2011 | Alfke |
| 2011/0246172 A1 | 10/2011 | Liberman et al. |
| 2013/0066623 A1 | 3/2013 | Chou et al. |
| 2013/0201316 A1 | 8/2013 | Binder et al. |
| 2014/0253674 A1 | 9/2014 | Grondal et al. |
| 2015/0356077 A1 | 12/2015 | Kristjansson et al. |
| 2016/0358629 A1 | 12/2016 | Pribula |
| 2017/0332035 A1 | 11/2017 | Shah et al. |
| 2018/0054506 A1 | 2/2018 | Hart et al. |
| 2018/0124123 A1 | 5/2018 | Moore et al. |
| 2018/0182141 A1 | 6/2018 | Caballero et al. |
| 2018/0227601 A1 | 8/2018 | Holzer et al. |
| 2018/0302659 A1 | 10/2018 | Srinivasan et al. |
| 2020/0153963 A1 | 5/2020 | Tichauer et al. |
| 2020/0213156 A1 | 7/2020 | Cheng et al. |
| 2021/0314632 A1 | 10/2021 | De Decker et al. |
| 2022/0329882 A1 | 10/2022 | Sze et al. |
| 2024/0298066 A1* | 9/2024 | Wachter ............. H04N 21/4852 |

OTHER PUBLICATIONS

U.S. Appl. No. 16/455,588, filed Jun. 27, 2019.

* cited by examiner

*Primary Examiner* — Adil Ocak
(74) *Attorney, Agent, or Firm* — Pierce Atwood LLP

(57) ABSTRACT

A content broadcast system may allow a user to select and start an audio stream of desired audio content without having to connect and authenticate to a specific device. Rather than a user having to pause the content and reconfigure settings of the broadcast system to select the desired audio content, the system may broadcast advertisements listing available audio content (e.g., corresponding to different spoken languages) and actively listen for requests from a device for new audio content to be streamed with the content. A user may manually select the new audio content, or the listening device may request particular audio content based on user preferences (e.g., a preferred language for streaming content). The system may broadcast audio data using a Bluetooth protocol.

20 Claims, 8 Drawing Sheets

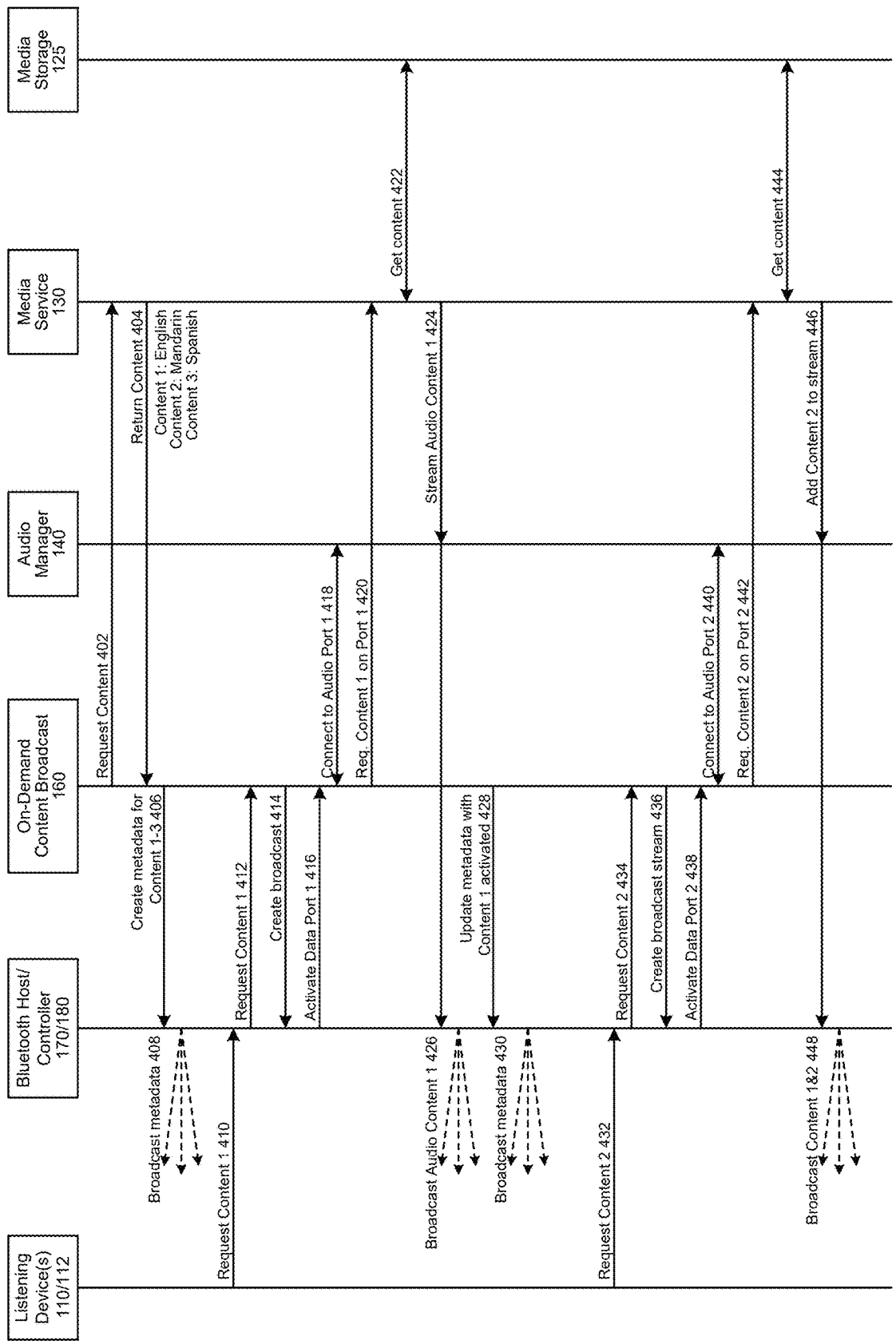

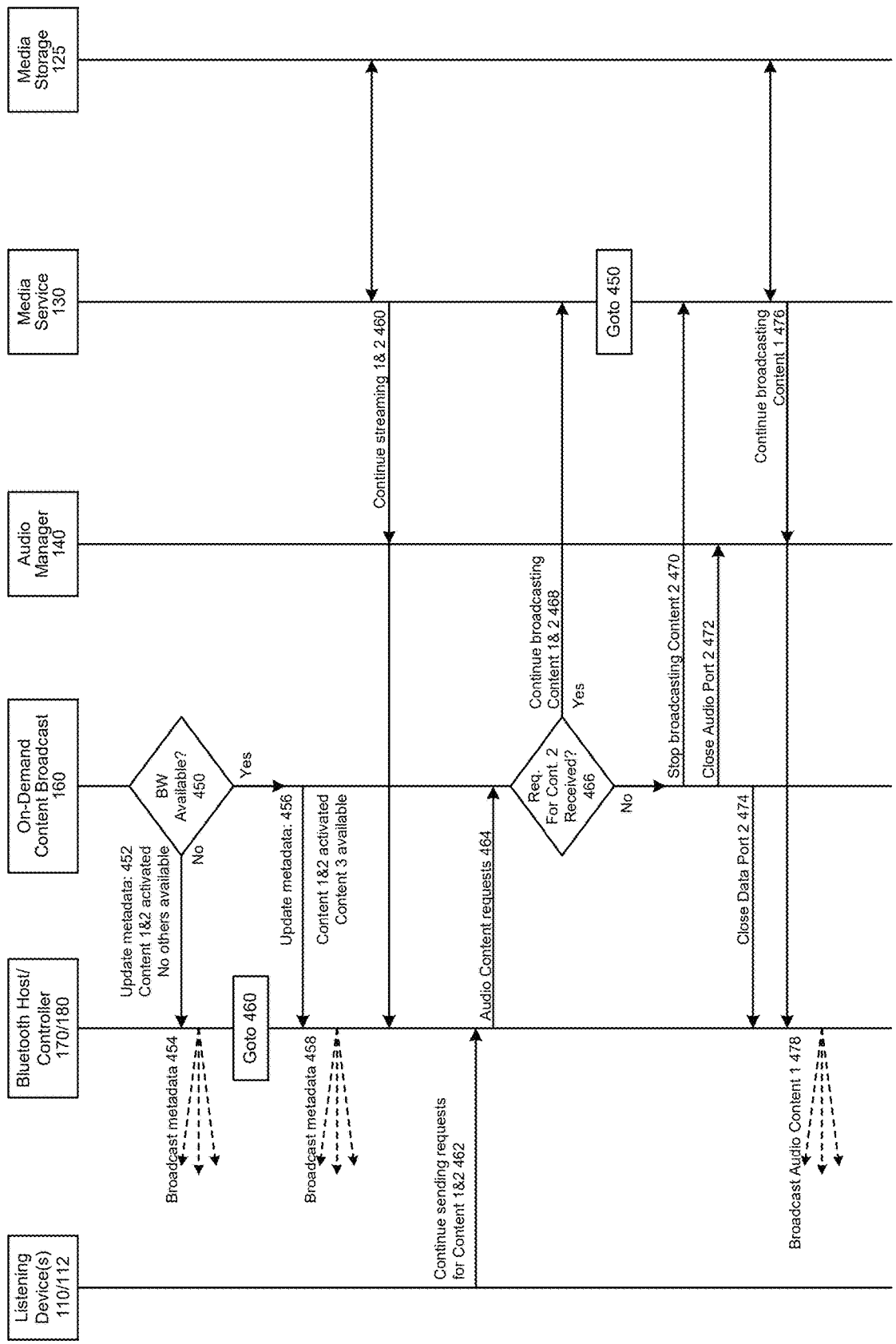

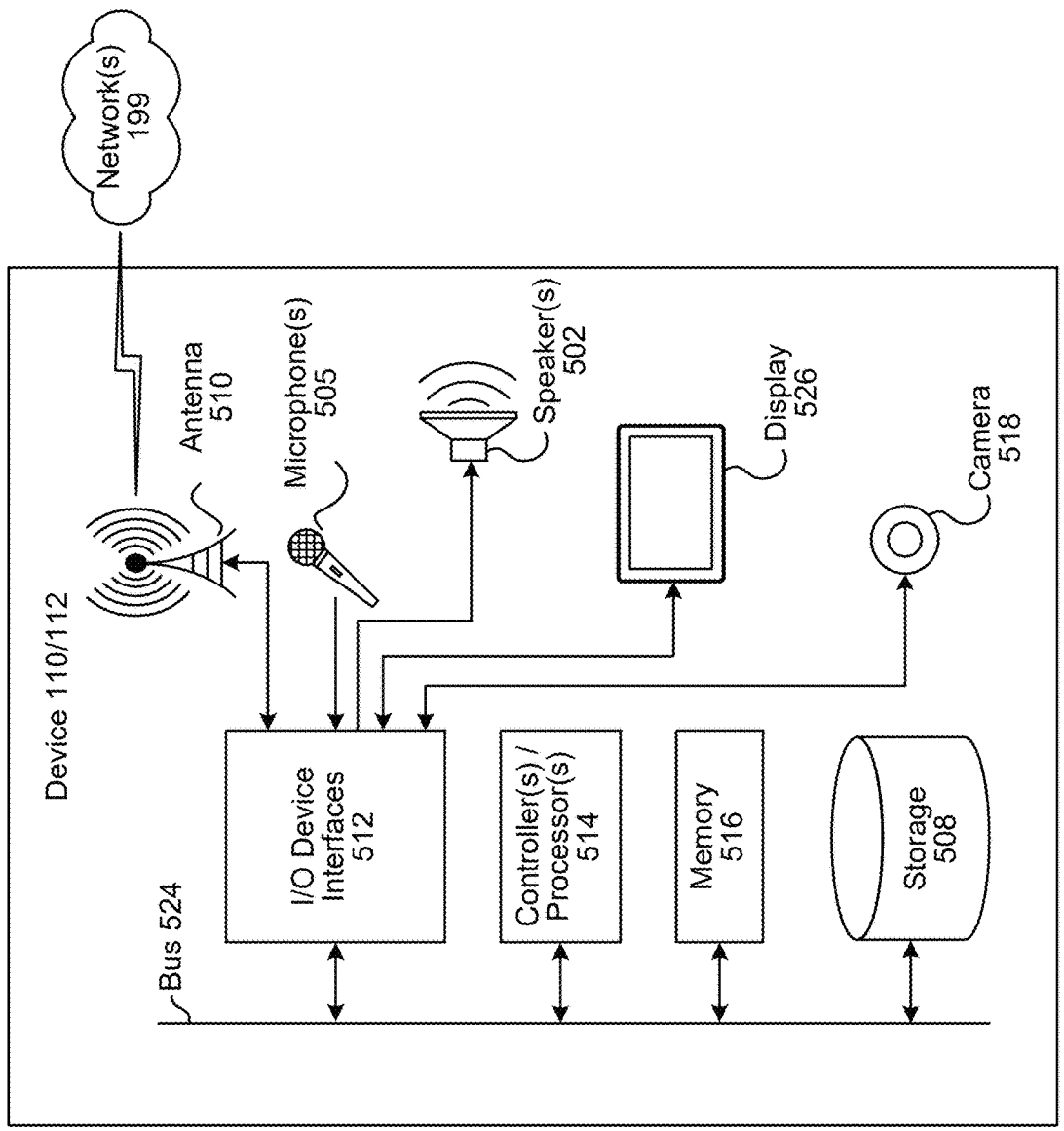

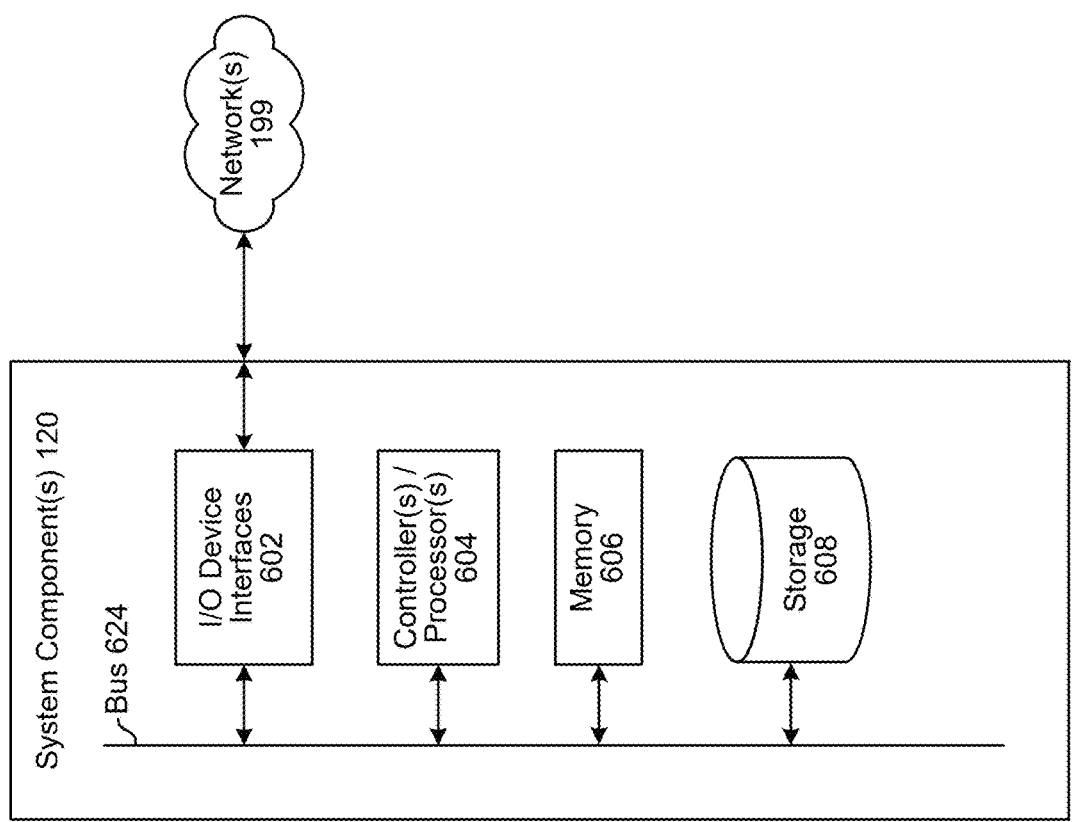

ON-DEMAND MULTI-AUDIO BROADCASTING

BACKGROUND

Listening devices, such as earbuds, headphones, headsets, and/or other devices may be used to output audio using one or more speakers and, in some cases, capture audio using a microphone. The listening device may be configured to communicate via a wired and/or wireless connection with a personal device (e.g., a smartphone, smartwatch, laptop, etc.) and/or a one-to-many broadcasting device (e.g., associated with a television, theater, conference facility, sports stadium, etc.). The listening device may receive audio data from the source device and output the corresponding audio. The audio may include, for example, music, sound effects, and/or speech from a movie, concert, meeting, sporting event, etc. In some cases, the source device may be able to send different audio content corresponding to, for example, different languages.

BRIEF DESCRIPTION OF DRAWINGS

For a more complete understanding of the present disclosure, reference is now made to the following description taken in conjunction with the accompanying drawings.

FIGS. 4A through 4B are signal flow diagrams illustrating example operations of the system, according to embodiments of the present disclosure.

FIG. 5 is a block diagram conceptually illustrating example components of a device, according to embodiments of the present disclosure.

FIG. 6 is a block diagram conceptually illustrating example components of a system, according to embodiments of the present disclosure.

DETAILED DESCRIPTION

Figure 1:
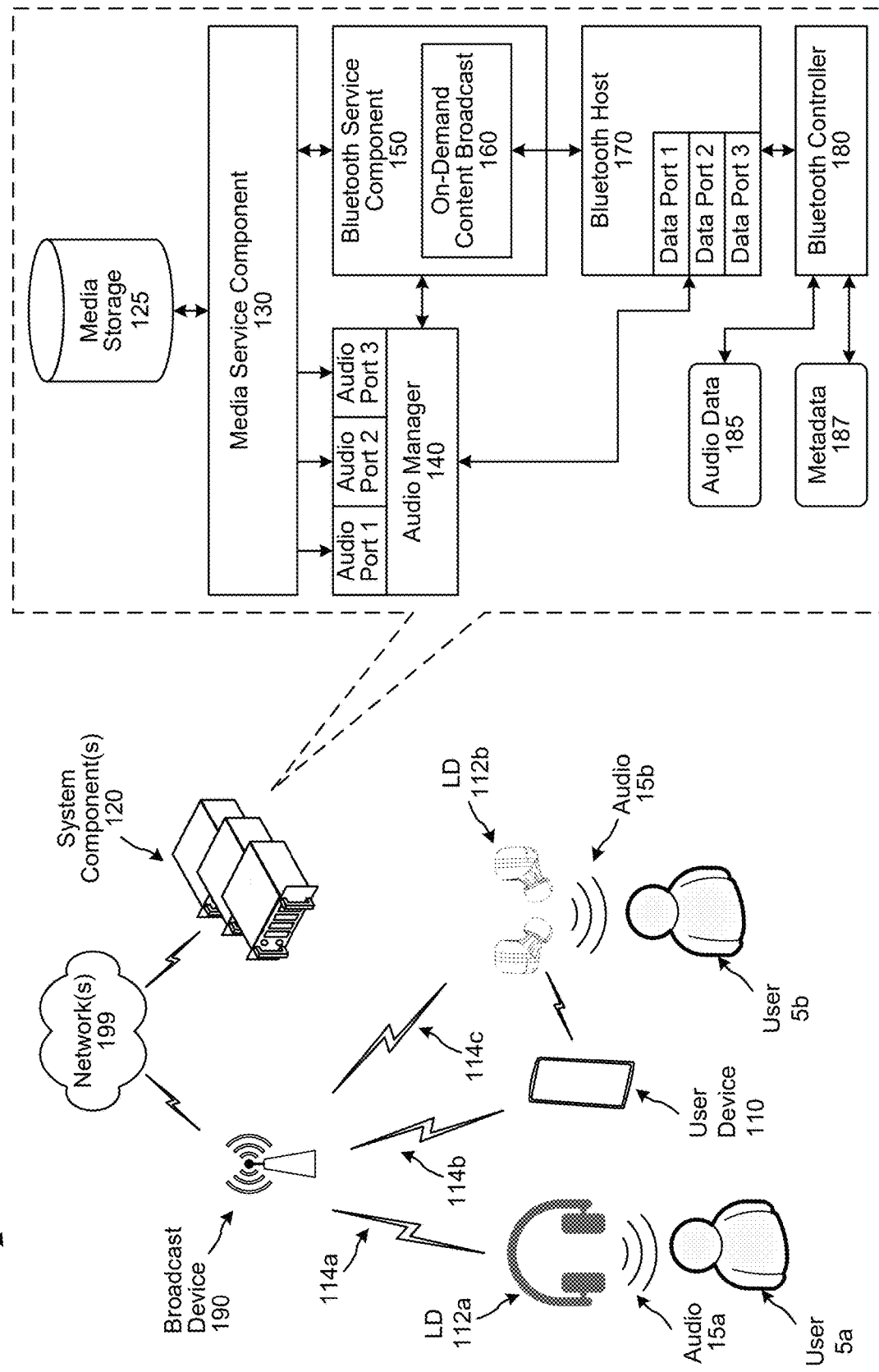
FIG. 1 illustrates a system implementing on-demand multi-audio broadcasting, according to embodiments of the present disclosure.

Personal audio output devices (e.g., "audio output devices" or "listening devices") may be carried and/or worn by a user to improve the listening experience and/or increase privacy associated with playback of audio data. Listening devices may include earphones (e.g., which may include different types of headphones and earbuds), speakers (e.g., for outputting audio to a room or open area), bone-conduction headphones (e.g., for transmitting audio through bones in a user's skull instead of their ear canal), etc. Headphones may include over-ear and on-ear types, and may be open-back or closed-back. Earbuds may include in-ear types, which may form a seal within the ear canal, and "open" or "classic" earbuds, which may form only a partial seal or no seal with the ear canal. Speakers may include wireless and/or portable speakers for personal listening, as well as desk/floor/wall-mounted speakers, studio monitors, etc.).

Listening devices may be used to stream (e.g., receive) a media content item from other devices. A listening device may be configured to receive audio from a source device using one or more wireless communication protocols such as the Bluetooth protocol. Bluetooth Classic Audio operates on the Bluetooth Classic radio. Bluetooth LE Audio operates on the Bluetooth Low Energy (LE) radio. LE Audio offers LE Isochronous Channels, which enables Multi-Stream Audio and Broadcast Audio. Multi-Stream Audio enables transmission of multiple, independent, synchronized audio streams between an audio device such as smartphone and one or more listening devices. Multi-Stream Audio involves a point-to-point bidirectional communication protocol with acknowledgment. Broadcast Audio (e.g., Bluetooth Auracast broadcast audio) enables an audio source device to broadcast multiple audio streams to an unlimited number of listening devices. Broadcast Audio involves a one-to-many broadcast packet transportation mechanism without acknowledgment.

While these and other audio streaming protocols can transmit an item of media content with various audio content, the protocols themselves do not control what audio content is provided. Thus, if a user wishes to receive audio content other than one currently being broadcast, they may have to pause the media content and change the configuration of the system or service that is providing the media content.

Offered herein are systems and methods that allow a user to select and start a new audio stream without having the connect and authenticate to a specific device. The system may broadcast a list of the available audio content and actively listen for requests for new audio content to be streamed. In some cases, a user may select the new audio content manually from the list of available audio content broadcast by the system. In some cases, a listening device may automatically request particular audio content based on user preferences; for example, by automatically requesting the audio content corresponding to the user's preferred listening language. Thus, the user may be able to receive the requested audio content, even if they have no control over the source device (e.g., a privately owned device broadcasting publicly). In this manner, a new user may join an in-progress media content broadcast and receive the desired listening experience without having to pause playback. Similarly, a user may switch to receiving different audio content without disrupting the listening/viewing experience for others in the audience.

The systems and methods described herein have myriad applications from listening to audio at meetings, sporting events, gyms, theaters, etc., where different users may wish to listen to different audio content on respective personal listening devices. The systems and methods may be used to provide different audio content corresponding to, for example, different spoken languages, commentary versus ambient audio for sporting events, stereo versus surround sound, etc. The systems and methods may apply to any protocol where a source device may broadcast media content with different media content to one or more listening devices. The media content may include audio-only content such as commentary and audio books, and/or multi-media content such as movies and television.

These and other features of the disclosure are provided as examples, and maybe used in combination with each other and/or with additional features described herein. The systems and methods may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. For example, the measurements and user selections described herein may constitute medical data and thus may be subject to laws governing the use of such information. The system and techniques can be implemented on a geographic basis to ensure compliance with laws in various jurisdictions and entities in which the components of the system and/or user are located.

Figure 7:
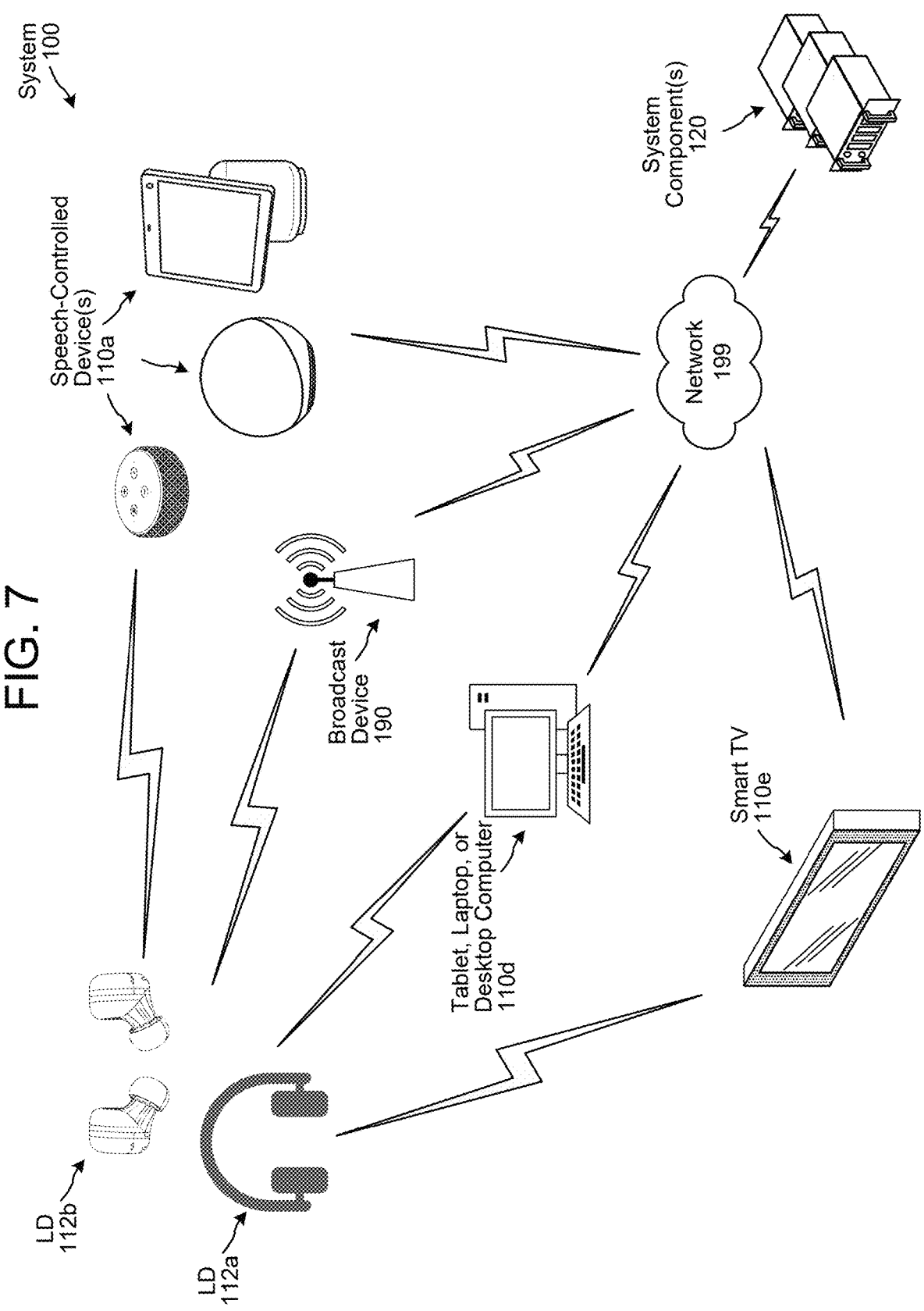
FIG. 7 illustrates an example of a computer network for use with the overall system, according to embodiments of the present disclosure.

FIG. 1 illustrates a system 100 implementing on-demand multi-audio broadcasting, according to embodiments of the present disclosure. The system 100 may include one or more system components 120 providing on-demand multi-audio broadcasting and one or more user devices 110 and/or listening devices 112 receiving the on-demand multi-audio broadcasting. The user device(s) 110 and/or listening device(s) 112 (collectively referred to as "audio output devices") may receive audio data via one or more wireless connections 114 to a broadcast device 190. The broadcast device 190 may include one or more antennas such as the antenna 510 shown in FIG. 5. In some implementations, the wireless connections 114 may employ a Bluetooth audio transmission protocol. In some implementations, the broadcast device 190 may be associated with a device such as a personal computer, television, etc., configured to broadcast audio to one or more users. In some implementations, the broadcast device 190 may be associated with a venue such as a theater, conference hall, sports stadium, etc. The broadcast device 190 may receive audio data 185 and/or metadata 187 from the system component(s) 120 and transmit them to the user device(s) 110 and/or listening device(s) 112 via the one or more wireless connections 114. Similarly, the broadcast device 190 may receive requests (e.g., for a media item and/or audio content associated with the media item) and/or other data from the user device(s) 110 and/or listening device(s) 112 via the one or more wireless connections 114. An example hardware implementation of a user device 110 and/or a listening device 112 is described below with reference to FIG. 5. An example hardware implementation of a system component 120 is described below with reference to FIG. 6. In some implementations, the various devices and/or components of the system may communicate as shown in FIG. 7.

A first user 5a may receive the audio data 185 via the broadcast device 190, a first wireless connection 114a and a first listening device 112a. The listening device 112a (e.g., a pair of headphones, earbuds, etc.) may output first audio 15a to the first user 5a. The audio data 185 may represent a first audio content of the media item being received by the first user 5a. The media item may be a live and/or prerecorded event such as a classroom lecture or a television show. The first audio content may correspond to, for example, a first spoken language (e.g., Mandarin).

As used herein and unless otherwise specified, the term "audio content" may refer to audio data corresponding to a particular language, feed, source, etc. Audio content may include multiple channels, such as left and right channels for stereo audio, center and rear channels for surround-sound, etc.

In an example operation, a second user 5b may wish to listen to the same broadcasted media content. The media item may include additional audio content; for example, corresponding to different spoken languages. The second user 5b may wish to receive the media content in a different language (e.g., Spanish). The broadcast device 190 may not be transmitting the audio content associated with the desired language at that time. The broadcast device 190 may, however, periodically broadcast metadata 187 representing a list of available audio content (e.g., languages). The second user 5b may, via a manual selection and/or a preference stored on their device, request desired audio content.

In some implementations, the metadata 187 may represent, for example, a Periodic Advertisement with Response (PAwR) (e.g., as described in the Bluetooth specification 5.4). The metadata 187 may be formatted include one or more subevents. The metadata 187 may include, in its payload, the available audio content (e.g., languages) available for the media item. A subevent may have one or more audio content descriptions each, depending on how much data is used to describe the audio content. For each subevent, a subevent response slot may be available. A listening device 112 may use the subevent response slot to request particular audio content not currently broadcast by the system 100. For example, if the system 100 is broadcasting media content with three choices of audio content available, the on-demand content broadcast component 160 may create metadata 187 having three subevents, with each subevent having one subevent response slots. A period of the subevent may be configured based on the latency versus power consumption of the desired use case. For example, a subevent may be sent every two seconds, which may introduce a modest but acceptable amount of latency while keeping system overhead low in terms of bandwidth and processor usage.

In some implementations, data other than audio may be synchronized to the subevents. For example, the subevents may include musical instrument digital interface (MIDI) or similar data that can control instruments, actuators, lights, etc. In some implementations, these subevents may be used to control various functions in themselves. In some implementations, the subevents may advertise a channel that conveys the control signals, which a device may request in a manner similar to requesting audio channels. The device may then receive the control signals and use them to perform actions that may be synchronized to the audio content. For example, the device may be (or control) a gaming chair, DJ lights, a laser projector, fog machine, actuators in a car or plane simulator, 3D glasses (e.g., which may have shutters synchronized to the content), etc.

In some implementations, the system 100 may send separate metadata 187 (e.g., separate advertisements) for different audio content. In some implementations, the system 100 may send metadata 187 (e.g., a single advertisement) listing all available audio content. Listing all available audio content using a single advertisement may preserve bandwidth. In some implementations, the metadata 187 may include a payload that represents the available language as a bitmap; for example, a binary 1 may correspond to a first language, 2 may correspond to a second language, 4 may correspond to a third language, etc.

In some implementations, the second user 5b may receive the audio data 185 and/or metadata 187 at a user device 110 associated with the second user 5b. In some implementations, the user device 110 may display a list or menu of available audio content, and the second user 5b may manually select their desired audio content from the list (e.g., via a graphical user interface (GUI)). In some implementations, the user device 110 may begin receiving audio data 185 corresponding to the selected audio content, and send the audio data 185 to the second listening device 112b for output as second audio 15b.

In some implementations, the user 5*b* may receive the audio data 185 and/or metadata 187 directly at the second listening device 112*b*. In some implementations, the user may select the desired audio content via a voice user interface (e.g., VUI). For example, the system 100 may output the list of available audio content in the form of synthesized speech conveyed in the second audio 15*b*. The system 100 may receive the second user's spoken selection of audio content via a microphone of the second listening device 112*b* and one or more speech processing components of the system 100. In some implementations, the second user 5*b* may select and receive the desired audio content using a combination of the user device 110 and the second listening device 112*b* (e.g., by making an audio content selection via the user device 110 and receiving the audio data 185 at the second listening device 112*b* from the broadcast device 190).

In some cases, the first user 5*a* may wish to a listen to different audio content from the one currently being broadcast by the system 100 and output as the first audio 15*a*. The first user 5*a* may receive the list of available audio content, make a selection, and begin receiving the desired audio content in a manner similar to that described for the second user 5*b* above. Additional users 5 may begin receiving the media content at their respective devices and, if an additional user 5 desires particular audio content that is not currently broadcast (or not one of various audio content currently being broadcast) the additional user 5 may request that the system add their desired audio content to the broadcast.

In some implementations, the system 100 may include one or more features to make efficient use of the bandwidth available to the system (e.g., the transmission capabilities of the broadcast device 190 and/or the wireless band/channel it is using). For example, the system 100 may begin broadcasting a media item with no audio content or only first audio content until and/or unless additional audio content is requested. A listening device 112 and/or user device 110 that is receiving the audio data 185 may continue to request the desired audio content (e.g., ever few seconds, few minutes, etc.). The system component(s) 120 may receive the requests (e.g., via the broadcast device 190) and continue broadcasting the audio content until and/or unless it does not receive a request for the audio content for a length of time (e.g., 30 seconds, a minute, etc.). If the system component(s) 120 determines that particular audio content has not be requested by any listening devices 112 or user devices 110 for a given length of time, the system component(s) 120 may cease broadcasting that audio content.

Components of the system component(s) 120 will now be described in more detail. The components may include hardware, software, or a combination of hardware and software. Unless otherwise specified, the components shown in FIG. 1 may reside on a single system component 120, may be divided between two or more system components 120, and/or duplicated among two or more system components 120. The system component(s) 120 may include a media storage component 125 that stores the media content for broadcast. In some implementations, however, the media content may be received live (e.g., in real time or on a brief delay via one or more video data and/or audio data feeds).

The system component(s) 120 may include a media service component 130. The media service component 130 may be responsible for managing the media content available for broadcast and/or currently being broadcast by the system 100. The media service component 130 may determine what media content is available for broadcast as well as what audio content is available for the media content. The media service component 130 may handle requests for content by, for example retrieving the desired media item from the media storage component 125 and providing the audio data for the various audio content to the audio manager 140 and Bluetooth service component 150.

The audio manager 140 may be based on the Bluetooth standards but modified to include an audio port for respective audio content streams; for example, Audio Port 1 may be configured to receive audio data corresponding to a first audio content (e.g., in Mandarin), Audio Port 2 may be configured to receive audio data corresponding to a second audio content (e.g., in Spanish), and so on. Although FIG. 1 shows an audio manager 140 with three audio ports, in various implementations the audio manager 140 may have more or fewer audio ports. The number of audio ports may be adjusted based on the various audio content included in the media content, the available bandwidth of the system 100, etc.

The Bluetooth service component 150 may be configured to include an on-demand content broadcast component 160. Based on the available audio content, the on-demand content broadcast component 160 may generate metadata 187 (including a list of available audio content) and handle incoming requests to add particular audio content to the broadcast. The on-demand content broadcast component 160 may receive the list of available audio content from the media service component 130 and/or the audio manager 140. The on-demand content broadcast component 160 may configure the audio manager 140 and/or the Bluetooth host component 170 for adding one or more new audio contents to a broadcast. The on-demand content broadcast component 160 may indicate to the media service component 130 to send specific data associated with specific audio content to a designated audio port for broadcast.

The Bluetooth host component 170 may be modified to include a data port for each available audio content stream; for example, Data Port 1 may be configured to receive audio data corresponding to a first audio content (e.g., in Mandarin), Data Port 2 may be configured to receive audio data corresponding to a second audio content (e.g., in Spanish), and so on.

Although FIG. 1 shows a Bluetooth host component 170 with three data ports, in various implementations the Bluetooth host component 170 may have more or fewer data ports. The number of data ports may be adjusted based on the number of audio content streams included in the media content, the available bandwidth of the system 100, etc. The Bluetooth host component 170 may implement a Bluetooth host protocol stack; for example, in a manner compatible with the Bluetooth standard 5.4. The Bluetooth host component 170 may receive audio data (e.g., via a data port) that is to be broadcast by the system 100.

The Bluetooth controller 180 may format the audio data 185 and/or metadata 187 to conform to the applicable standards for transmission. The Bluetooth controller 180 may also handle the turning on/turning off of the one or more radios associated with Bluetooth protocol transmission and reception. In some implementations, the one or more radios may be included in the broadcast device 190. Thus, the Bluetooth controller 180 may also control synchronization of radio activation, transmission, and reception by, for example, broadcasting timing information to the user devices 110 and/or listening devices 112 and then transmitting and receiving at the specified times. The Bluetooth controller 180 may implement a Bluetooth host protocol stack; for example, in a manner compatible with the Bluetooth standard 5.4.

In some implementations, the system 100 may implement one or more Bluetooth standards. For example, the Bluetooth controller 180 may operate according to the Bluetooth 5.2 standard. The Bluetooth host component 170 may operate according to the Bluetooth 5.3 standard. In some implementations, the system 100 may generate and transmit the metadata 187 according to the Bluetooth 5.4 standard. In various implementations, other standards may be implemented.

In some implementations, the system component(s) 120 may communicate with the broadcast device 190 over one or more computer networks 199 as shown in FIG. 1. For example, the system component(s) 120 may reside on a back-end server that transmits content via the Internet to a different location, where the broadcast device 190 transmits the content to one or more nearby user devices 110 and/or listening devices 112. In some cases, the system component(s) 120 and the broadcast device 190 may have a direct connection via, for example, ethernet, USB, etc.

Figure 2:
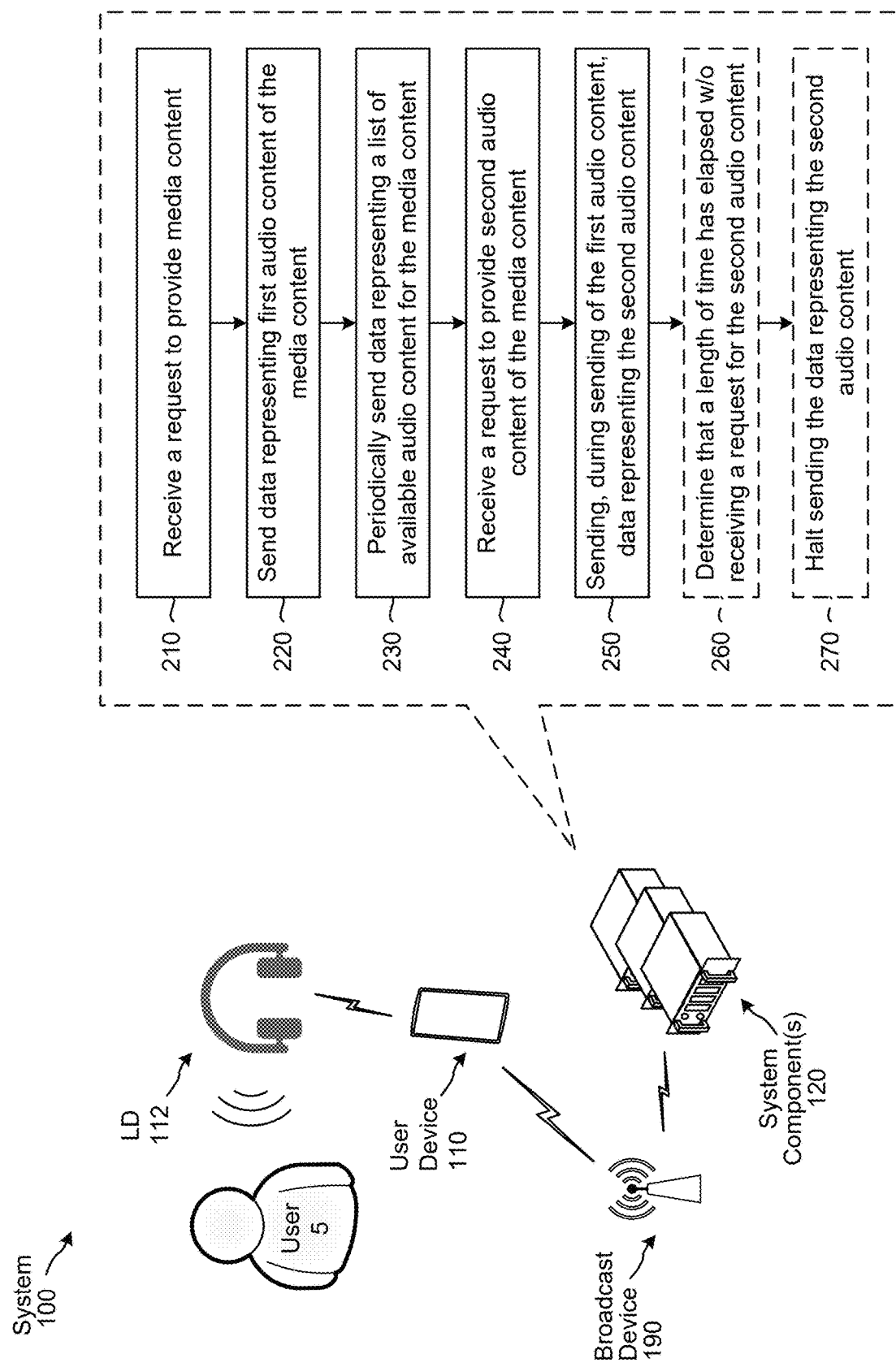
FIG. 2 is a diagram illustrating example operations of system components providing on-demand multi-audio broadcasting, according to embodiments of the present disclosure.

FIG. 2 is a diagram illustrating example operations of system components providing on-demand multi-audio broadcasting, according to embodiments of the present disclosure. The example operations may include receiving (210) a first request to provide an item of media content to a listening device. The request may be from a user 5 associated with a listening device 112 and/or from an administrator who controls the broadcasting of media content by the system 100. The system 100 may begin sending (220) the media content with first data representing a first audio content of the media content. In some implementations, the system 100 may broadcast the content using a Bluetooth Low Energy Audio protocol.

The example operations may include periodically sending (230), with the first data (e.g., in a combined data stream and/or during overlapping time periods), second data representing a list of available audio content for the media item. The list may include at least a second audio content different from the first audio content. In some implementations, the system 100 may send, with the second data (e.g., in a same advertisement and/or different advertisements), third data representing timing information corresponding to transmission of the second audio content.

The example operations may include receiving (240), while broadcasting the first data, a second request to provide the second audio content of the media item. The second request may have been sent by the same listening device that sent the first request or by a different listening device. The second request may correspond to, for example, a second language while the first request may have corresponded to a first language. The system 100 may begin sending (250), during the sending of the first data, third data representing the second audio content. The system 100 may update the metadata 187 to indicate the audio content currently being broadcast and, in some cases, any additional audio content that may be available.

In some implementations, the system 100 may determine whether sufficient bandwidth is available to broadcast additional audio content during broadcasting of the first data and/or the third data. The available bandwidth may depend on the capacity of the channel used to broadcast the audio content and the amount of data currently being transmitted over that channel (e.g., a Bluetooth Auracast channel). If the channel capacity minus the bandwidth currently being used exceeds the bandwidth required for streamlining additional audio content, the system 100 may continue to broadcast the additional available audio content. For example, stereo audio content in an mp3 format may use 160 kbps of bandwidth. If the capacity of the channel over which the system is broadcasting has only 100 kpbs of bandwidth available, the system 100 may determine that it will not be able to add additional audio content to the broadcast. If 200 kpbs of bandwidth is available, the system 100 may determine that it will be able to add the additional audio content to the broadcast. In some implementations, the system 100 may be able to adjust the bit rate of audio content. For example, if the system 100 is streaming a single piece of audio content, it may provide that audio content at the highest bit rate/quality. If additional audio content is requested, the system 100 may provide switch to broadcasting the first audio content at a lower bit rate and adding the second audio content to the broadcast (e.g., also at the lower bit rate). In either case, the system 100 may determine the total bandwidth of the hardware and/or channel, subtract the portion of bandwidth currently being used to broadcast content, determine the bandwidth required to broadcast additional content, and determine if the available bandwidth is sufficient to add the additional content. If the system 100 determines that sufficient bandwidth is available, the system 100 may list the additional available audio content in the second data. If insufficient bandwidth is available to broadcast additional audio content during broadcasting of the first data and/or the third data, the system 100 may cease advertising the availability of additional audio content. The system 100 may continue periodically broadcasting metadata 187 that indicate the audio content currently being broadcast.

In some implementations, the system 100 may determine (260) whether a period of time has elapsed without receiving a request to continue providing any of the audio content currently being broadcast. If the system 100 has recently received a request for particular audio content, the system 100 may continue broadcasting that audio content. If, however, the system has not received a request for particular audio content for a predetermined length of time, the system 100 may halt (270) broadcasting of that audio content. The system 100 may update the periodic metadata 187 broadcasts to reflect the audio content currently being broadcast as well as any additional available audio content that may be broadcast (e.g., due to the additional bandwidth available).

Figure 3:
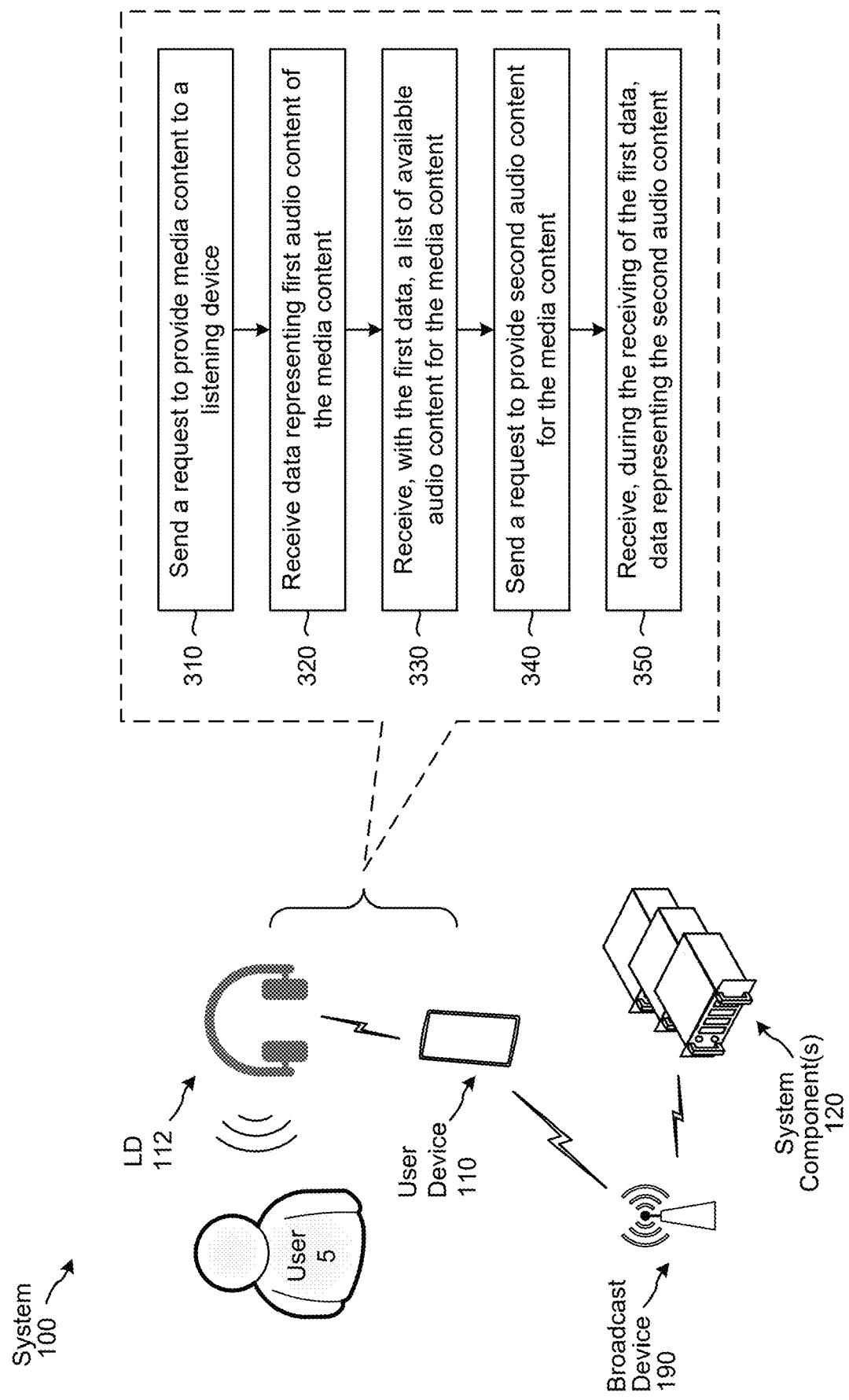
FIG. 3 is a diagram illustrating example operations of a user device and/or listening device receiving on-demand multi-audio broadcasting, according to embodiments of the present disclosure.

FIG. 3 is a diagram illustrating example operations of a user device and/or listening device receiving on-demand multi-audio broadcasting, according to embodiments of the present disclosure. The operations may include sending (310) a first request to provide an item of media content to a first listening device. The request may be sent from/by the listening device itself and/or by a user device associated with the listening device. In some cases, the operations may include requesting particular audio content of the media item. In other cases, a first audio content may be provided for the media content by default. The operations may include receiving (320), by the first listening device, first data representing a first audio content of the media item. In some implementations, the device may receive the first data via a Bluetooth audio protocol such as Classic Audio and/or LE Audio. The first audio content may correspond to, for example, a first spoken language. The operations may include receiving (330), during receiving of the first data, second data representing a list of available audio content for the media item, the list including at least a second audio content different from the first audio content. The second audio content may correspond to, a second spoken language.

In some cases, the second data may include timing information. The listening device may use the timing information to synchronize its radios to transmit/receive at times specified by, for example, the broadcast device 190 of the system 100.

The operations may include sending (340), while the first listening device is receiving the first data, a second request to provide the second audio content of the media item. In some cases, the request may be manual (e.g., a user selecting a desired language from a menu). In some cases, the request may be automatic. For example, the requesting audio output device 110/112 may be configured to request a preferred language when receiving media content via the system 100. The configuration may be representing in, for example, a user profile of a user associated with the device, and/or a device configuration. The second request may originate from the same audio output device 110/112 as the first request or a different device. The operations may include receiving (350), during the receiving of the first data, third data representing the second audio content. The requesting listening device (and/or any others receiving the broadcast) may receive the third data and output the corresponding audio.

FIGS. 4A through 4B are signal flow diagrams illustrating example operations of the system, according to embodiments of the present disclosure. The flow diagrams illustrate the flow of data between one or more listening devices (which may be, e.g., user device(s) 110 and/or listening device(s) 112) and one or more system components 120. Communication between the listening device(s) 112 and/or the system component(s) 120 may occur via the broadcast device 190 and/or one or more computer networks 199, as shown in FIGS. 1 through 3. Components of the on-demand multi-audio broadcasting system 100 may include the Bluetooth host component 170 and the Bluetooth controller 180 (combined for simplicity), the on-demand content broadcast component 160 (e.g., with in the Bluetooth service component 150), the audio manager 140, the media service component 130, and/or the media storage component 125.

Initiation of a media content broadcast may begin by user request (e.g., from a user device 110) and/or by an administrator of the system 100 (e.g., who may be a producer, director, audio engineer, etc.) via an interface to the on-demand content broadcast component 160. The media content may include live and/or pre-recorded news, movie, sports, etc. Once the instruction to broadcast media content has been given, the on-demand content broadcast component 160 may send a request (402) to the media service component 130 for the media content. The media service component 130 may return (404) information about the media content including, for example, a list of audio content associated with the media content. In the example shown in FIGS. 4A and 4B, the audio content includes first audio content corresponding to English, second audio content corresponding to Mandarin, and third audio content corresponding to Spanish. The on-demand content broadcast component 160 may create (406) metadata 187 that lists the available audio content and send it to the Bluetooth host component 170 and/or Bluetooth controller 180. The Bluetooth controller 180 may broadcast (408) the metadata, which may be subsequently received by the one or more listening devices. In some implementations, the metadata may be, for example, a PAwR. The listening device may refresh (e.g., continue to send) requests periodically to indicate that it is still listening, and to cause the system 100 to continue broadcasting the requested audio content. If no requests for particular audio content are received for a period of time (e.g., 30 seconds), the system 100 may, as shown in FIG. 4B, halt broadcast of that audio content to conserve resources (e.g., bandwidth of the broadcast device 190).

One or more listening devices may receive the metadata 187 and request (410) some of the audio content indicated in the metadata. In the example shown in FIG. 4A, a user device 110 or listening device 112 may request audio content 1. The Bluetooth controller 180 may receive the request and send (412) the request to the on-demand content broadcast component 160. The on-demand content broadcast component 160 may cause (414) the Bluetooth host component 170 to create a broadcast stream for the audio content (e.g., by activating a data port). In some implementations, the broadcast may be a Bluetooth Auracast. Creating the broadcast stream may include creating a Broadcast Isochronous Group (BIG) and a Broadcast Isochronous Stream (BIS). In some implementations, the broadcast may include Bluetooth Multi-Stream Audio. Creating the broadcast stream may include creating a Connected Isochronous Group (CIG) and Connected Isochronous Stream (CIS). The Bluetooth host component 170 may activate (416) Data Port 1 for the first audio content, and notify the on-demand content broadcast component 160. The on-demand content broadcast component 160 may connect (418) Data Port 1 to an audio port of the audio manager 140 for the requested audio content. The audio manager 140 may activate Audio Port 1 for the first audio content. The on-demand content broadcast component 160 may request (420) the media service component 130 to provide the first audio content data to Audio Port 1 of the media service component 130. The media service component 130 may get (422) the requested audio content of the media content from the media storage component 125. The media service component 130 may send (424) the audio content to the Bluetooth controller 180. In some cases, the media service component 130 may send the audio content to the audio manager 140. The audio manager 140 add functionality by allowing a user and/or administrator to modify the audio content prior to broadcast. For example, the audio manager 140 may allow volume adjustment, mixing relative volume of different tracks of audio data, controlling stereo and/or surround-sound parameters, etc. The Bluetooth host component 170 may broadcast (426) the audio content for reception by the various listening devices. The Bluetooth host component 170 may send the audio content (e.g., portions of audio data) over a first period of time.

The on-demand content broadcast component 160 may update (428) the metadata 187 to indicate that audio content 1 is currently broadcasting as well as which other audio content (if any) are available (e.g., but not currently broadcasting). In some cases, as shown in FIG. 4B, the list of audio content broadcast in the metadata may depend on the amount of bandwidth available to convey additional audio content. The Bluetooth host component 170 may broadcast (430) the metadata for reception by the various listening devices. The Bluetooth host component 170 may continue broadcasting the metadata periodically over a same period of time it broadcasts the audio content.

At some time, a user device 110 and/or listening device 112 may receive the metadata 187 and request (432) different audio content, in this case audio content 2 corresponding to Mandarin. The requesting device may be a new device or the same device that made the request at (410) (e.g., wishing to listen to a different audio feed). The system 100 may add the second audio content to the broadcast using operations similar to those previously described for the first request. The Bluetooth controller 180 may receive the request and send (434) the request to the on-demand content broadcast component 160. The on-demand content broadcast component 160 may cause (436) the Bluetooth host component 170 to create a broadcast stream for the audio content (e.g., by activating a data port). The Bluetooth host component 170 may activate (438) Data Port 2 for the second audio content, and notify the on-demand content broadcast component 160. The on-demand content broadcast component 160 may connect (440) Data Port 2 to an audio port of the audio manager 140 for the requested audio content. The audio manager 140 may activate Audio Port 2 for the second audio content. The on-demand content broadcast component 160 may request (442) the media service component 130 to provide the second audio content data to Audio Port 2 of the media service component 130. The media service component 130 may get (444) the requested audio content of the media content from the media storage component 125. The media service component 130 may send (446) the audio content to the Bluetooth controller 180. The Bluetooth host component 170 may add the second audio content to the broadcast and broadcast (448) the first audio content and the second audio content over a second period of time following the first period of time, for reception by the various listening devices.

FIG. 4B is a continuation of the signal flow diagram of FIG. 4A, illustrating example operations of the system 100 as the media content broadcast continues. With the system 100 broadcasting the first and second audio contents, the on-demand content broadcast component 160 may determine (450) whether sufficient bandwidth remains to broadcast additional audio content. The available bandwidth may depend on the capacity of the channel used to broadcast the audio content (e.g., a Bluetooth Auracast channel) and the amount of data currently being transmitted over that channel (e.g., the bandwidth used to stream the first audio content and second audio content). If the channel capacity minus the bandwidth currently being used to send data over that channel is greater than the bandwidth required for streamlining additional audio content (e.g., the bandwidth required to stream third audio content associated with the media item), the system 100 may continue to broadcast the additional available audio content. If the available bandwidth is less than the bandwidth of the additional audio content, the system 100 may not advertise additional audio content. For example, stereo audio content in an mp3 format may use 160 kbps of bandwidth. If the hardware and/or channels over which the system is broadcasting have only 100 kpbs of bandwidth available, the system 100 may determine that it will not be able to add additional audio content to the broadcast. If 200 kpbs of bandwidth is available, the system 100 may determine that it will be able to add the additional audio content to the broadcast. In some implementations, the system 100 may be able to adjust the bit rate of audio content. For example, if the system 100 is streaming a single piece of audio content, it may provide that audio content at the highest bit rate/quality. If additional audio content is requested, the system 100 may provide switch to broadcasting the first audio content at a lower bit rate and adding the second audio content to the broadcast (e.g., also at the lower bit rate). In either case, the system 100 may determine the total bandwidth of the hardware and/or channel, subtract the portion of bandwidth currently being used to broadcast content, determine the bandwidth required to broadcast additional content, and determine if the available bandwidth is sufficient to add the additional content. In some implementations, the determination will result in a yes or no based on any additional audio content may be broadcast within the bandwidth constraints of the system 100 and/or based on a preconfigured maximum amount of audio content (e.g., number of languages). In some implementations, a decision whether to include particular audio content in the metadata may depend on the available bandwidth and the size of the particular audio content; for example, the list may include first audio content requiring a lower amount of bandwidth currently available while excluding other audio content requiring a higher amount of bandwidth that is not currently available. If the on-demand content broadcast component 160 determines that insufficient bandwidth is available ("no" at 450), the on-demand content broadcast component 160 may update (452) the metadata to indicate that audio contents 1 and 2 are currently activated (e.g., being broadcast by the system 100) but no other audio content are available. The Bluetooth controller 180 may then broadcast (454) the updated metadata. (If, however, at some point in the future the system 100 has the bandwidth to broadcast additional audio content, it may update the metadata yet again with a list of the available audio content.) If the on-demand content broadcast component 160 determines that sufficient bandwidth is available to broadcast additional audio content ("yes" at 450), the on-demand content broadcast component 160 may update (456) the metadata to indicate the additional available audio content and to indicate that audio contents 1 and 2 are currently activated. The Bluetooth controller 180 may then broadcast (458) the updated metadata. The media service component 130 may continue broadcasting (460) the first and second audio contents via the Bluetooth controller 180 and/or the Bluetooth host component 170. In ither case, the Bluetooth host component 170 may continue broadcasting the metadata periodically over a same period of time it broadcasts the first audio content and the second audio content.

Any user device(s) 110 and/or listening device(s) 112 currently receiving the media content may send (462) period requests for the audio contents that it/they is/are receiving. The Bluetooth host component 170 may forward (464) the content requests to the on-demand content broadcast component 160. The on-demand content broadcast component 160 may monitor the requests and halt broadcast of any audio content that go unrequested for a certain length of time. For example, the on-demand content broadcast component 160 may monitor how much time has elapsed since last receiving a request for particular audio content. The on-demand content broadcast component 160 may determine (466) whether it has received a request for the second audio content in the last, for example, 10 seconds, 30 seconds, 60 seconds, 90 seconds, etc. If the on-demand content broadcast component 160 has recently received a request for the first and second audio contents ("yes" at 466), the on-demand content broadcast component 160 may instruct (468) the media service component 130 to continue broadcasting the first and second audio contents.

If, however, the on-demand content broadcast component 160 determines that it has not recently received a request for the second audio content ("no" at 466), the on-demand content broadcast component 160 may instruct (470) the media service component 130 to halt broadcasting of the second audio content. The on-demand content broadcast component 160 may instruct (472) the audio manager 140 to close the audio port associated with the discontinued audio content; in this case, Audio Port 2. The on-demand content broadcast component 160 may instruct (474) the Bluetooth controller 180 to close the data port associated with the discontinued audio content; in this case, Data Port 2. The media service component 130 may continue broadcasting (476) the first audio content, and the Bluetooth controller 180 may continue broadcasting (478) it.

In various implementations, the system 100 may perform similar operations for additional listening devices, audio content requests, and/or available audio content. In various implementations, the system 100 perform the example operations in different orders, and may perform more, different, and/or fewer operations in various circumstances.

FIG. 5 is a block diagram conceptually illustrating a device such as a user device 110 and/or a listening device 112. Audio output device(s) 110/112 may include one or more controllers/processors 514, which may each include a central processing unit (CPU) for processing data and computer-readable instructions and a memory 516 for storing data and instructions of the respective device. The memories 516 may individually include volatile random-access memory (RAM), non-volatile read-only memory (ROM), non-volatile magnetoresistive (MRAM) memory, and/or other types of memory. Each device may also include a data-storage component for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces.

Computer instructions for operating audio output device(s) 110/112 and their various components may be stored in a storage 508, executed by the respective device's controller(s)/processor(s) 514, using the memory 516 as temporary "working" storage at runtime. A device's computer instructions may be stored in a non-transitory manner in the memory 516, storage 508, or an external device(s). Alternatively, some or all of the executable instructions may be embedded in hardware or firmware on the respective device in addition to or instead of software.

Audio output device(s) 110/112 may include input/output device interfaces 512. A variety of components may be connected through the input/output device interfaces, as will be discussed further below. Additionally, each audio output device(s) 110/112 may include an address/data bus 524 for conveying data among components of the respective device. Each component within audio output device(s) 110/112 may also be directly connected to other components in addition to (or instead of) being connected to other components across the bus 524.

Audio output device(s) 110/112 may also include audio capture and/or output components. The audio capture component may be, for example, a microphone 505 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The audio output component may be, for example, a speaker 502, a separate wired headset or a wireless headset (not illustrated), or other component capable of outputting audio. Audio output device(s) 110/112 may additionally include a display 526 for displaying visual content. Audio output device(s) 110/112 may further include a camera 518.

For example, via the one or more antenna(s) 510, the input/output device interfaces 512 may connect to one or more networks 199 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, etc. A wired connection such as Ethernet may also be supported. Through the network(s) 199, the speech processing system may be distributed across a networked environment.

While the audio output device(s) 110/112 may operate locally to a user (e.g., within a same environment so the device may receive inputs and playback outputs for the user), some system component(s) 120 may be located remotely from the audio output device(s) 110/112 (e.g., because their operations may not require proximity to the user). Some system component(s) 120 may be located in an entirely different location from the audio output device(s) 110/112 (for example, as part of a cloud computing system or the like) or may be located in a same environment as the audio output device(s) 110/112 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the system component(s) 120 being in a user's home/business is that data used to process a command/return a response may be kept within the user's home, thus reducing potential privacy concerns.

FIG. 6 is a block diagram conceptually illustrating example components of a system component 120. One or more system components 120 may be included in the overall system 100 of the present disclosure. In operation, each of these systems may include computer-readable and computer-executable instructions that reside on the respective system component 120, as will be discussed further below.

The system component(s) 120 may include one or more controllers/processors 604, which may each include a central processing unit (CPU) for processing data and computer-readable instructions, and a memory 606 for storing data and instructions of the respective device. The memories 606 may individually include volatile random-access memory (RAM), non-volatile read only memory (ROM), non-volatile magnetoresistive memory (MRAM), and/or other types of memory. The system component(s) 120 may also include a data storage component 608 for storing data and controller/processor-executable instructions. Each data storage component 608 may individually include one or more non-volatile storage types such as magnetic storage, optical storage, solid-state storage, etc. The system component(s) 120 may also be connected to removable or external non-volatile memory and/or storage (such as a removable memory card, memory key drive, networked storage, etc.) through respective input/output device interfaces 602.

Computer instructions for operating the system component(s) 120 may be executed by the processor(s) 604, using the memory 606 as temporary "working" storage at runtime. A device's computer instructions may be stored in a non-transitory manner in non-volatile memory 606, data storage component 608, or an external device(s). Alternatively, some or all of the executable instructions may be embedded in hardware or firmware on the respective device in addition to or instead of software.

The system component(s) 120 includes input/output device interfaces 602. A variety of components may be connected through the input/output device interfaces 602, as will be discussed further below. Additionally, the system component(s) 120 may include an address/data bus 624 for conveying data among components of the respective device. Each system component 120 may also be directly connected to other components in addition to (or instead of) being connected to other components across the bus 624.

As illustrated in FIG. 7, multiple audio output devices 110/112/120/130 may contain components of the system 100 and the devices may be connected over a network 199. The network 199 may include one or more local-area or private networks and/or a wide-area network, such as the Internet. Local devices may be connected to the network 199 through either wired or wireless connections. For example, a speech-controlled device 110*a*, a broadcast device 190, a tablet/laptop/desktop computer 110*d*, and/or smart television 110*e* may be connected to system component(s) 120 over the network 199. One or more system component(s) 120 may be connected to the network 199 and may communicate with the other devices therethrough. The listening device 112 may similarly be connected to the system component(s) 120 either directly or via a network connection to one or more of the other user devices 110 and/or broadcast device 190.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   receiving a first request to provide media content to a first audio output device;
   sending, over a first period of time, portions of first audio data corresponding to first audio content of the media content;
   periodically sending, over the first period of time, metadata listing available audio content for the media content, the metadata including information about at least second audio content different from the first audio content;
   receiving, during the first period of time, a second request to provide the second audio content of the media content; and
   sending, over a second period of time following the first period of time, the portions of the first audio data and portions of second audio data corresponding to the second audio content.

2. The method of claim 1, further comprising:
   receiving, prior to sending the portions of the first audio data, a third request to provide the media content in a first language; and
   determining that the third request corresponds to the first audio content, wherein sending the portions of the first audio data is based on receiving the third request and the second audio content corresponds to a second language different from the first language.

3. The method of claim 1, further comprising:
   sending, over the first period of time, timing information corresponding to transmission of the portions of the second audio data.

4. The method of claim 1, further comprising:
   determining a channel capacity of a channel used to broadcast the first audio data;
   determining a first bandwidth corresponding to data being sent over the first period of time;
   determining an available bandwidth based on the channel capacity and the first bandwidth; and
   determining that the available bandwidth exceeds a second bandwidth corresponding to the second audio data, wherein periodically sending the metadata over the first period of time is in response to determining that the available bandwidth exceeds the second bandwidth.

5. The method of claim 1, further comprising:
  determining a channel capacity of a channel used to broadcast the first audio data;
  determining a first bandwidth corresponding to data being sent over the second period of time;
  determining an available bandwidth based on the channel capacity and the first bandwidth;
  determining that the available bandwidth is less than second bandwidth corresponding to third audio data associated with the media content; and
  in response to determining that the available bandwidth is less than second bandwidth corresponding to third audio data associated with the media content, halting sending of the metadata during the second period of time.

6. The method of claim 1, further comprising:
  receiving a third request to continue providing the first audio data; and
  in response to the third request, continuing to send portions of the first audio data.

7. The method of claim 1, further comprising:
  determining that a first length of time has elapsed without receiving a request to continue providing the second audio data; and
  in response to determining that the first length of time has elapsed without receiving a request to continue sending the second audio data, halting the sending of the second audio data.

8. A system, comprising:
  at least one processor; and
  at least one memory comprising instructions that, when executed by the at least one processor, cause the system to:
    receive a first request to provide media content to a first audio output device;
    send, over a first period of time, portions of first audio data corresponding to first audio content of the media content;
    periodically send, over the first period of time, metadata listing available audio content for the media content, the metadata including information about at least second audio content different from the first audio content;
    receive, during the first period of time, a second request to provide the second audio content of the media content; and
    send, over a second period of time following the first period of time, the portions of the first audio data and portions of second audio data corresponding to the second audio content.

9. The system of claim 8, wherein the at least one memory further comprises instructions that, when executed by the at least one processor, further cause the system to:
  receive, prior to sending the portions of the first audio data, a third request to provide the media content in a first language; and
  determine that the third request corresponds to the first audio content, wherein sending the portions of the first audio data is based on receiving the third request and the second audio content corresponds to a second language different from the first language.

10. The system of claim 8, wherein the at least one memory further comprises instructions that, when executed by the at least one processor, further cause the system to:
  send, over the first period of time, timing information corresponding to transmission of the portions of the second audio data.

11. The system of claim 8, wherein the at least one memory further comprises instructions that, when executed by the at least one processor, further cause the system to:
  determine a channel capacity of a channel used to broadcast the first audio data;
  determine a first bandwidth corresponding to data being sent over the first period of time;
  determine an available bandwidth based on the channel capacity and the first bandwidth; and
  determine that the available bandwidth exceeds a second bandwidth corresponding to the second audio data, wherein periodically sending the metadata over the first period of time is in response to determining that the available bandwidth exceeds the second bandwidth.

12. The system of claim 8, wherein the at least one memory further comprises instructions that, when executed by the at least one processor, further cause the system to:
  determine a channel capacity of a channel used to broadcast the first audio data;
  determine a first bandwidth corresponding to data being sent over the second period of time;
  determine an available bandwidth based on the channel capacity and the first bandwidth;
  determine that the available bandwidth is less than second bandwidth corresponding to third audio data associated with the media content; and
  in response to determining that the available bandwidth is less than second bandwidth corresponding to third audio data associated with the media content, halt sending of the metadata during the second period of time.

13. The system of claim 8, wherein the at least one memory further comprises instructions that, when executed by the at least one processor, further cause the system to:
  receive a first request to provide media content to a first audio output device; a third request to continue providing the first audio data; and
  in response to the third request, continue to send portions of the first audio data.

14. The system of claim 8, wherein the at least one memory further comprises instructions that, when executed by the at least one processor, further cause the system to:
  determine that a first length of time has elapsed without receiving a request to continue providing the second audio data; and
  in response to determining that the first length of time has elapsed without receiving a request to continue sending the second audio data, halt the sending of the second audio data.

15. A method comprising:
  receiving, by a first device over a first period of time, portions of first audio data corresponding to first audio content of a media item;
  receiving, during the first period of time, metadata listing available audio content for the media item, the metadata including information about at least second audio content different from the first audio content;
  sending, during the first period of time, a first request to provide the second audio content of the media item; and
  receiving, over a second period of time following the first period of time, portions of the first audio data and portions of second audio data corresponding to the second audio content.

16. The method of claim 15, further comprising:
  sending, prior to receiving the first audio data, a second request for the first audio content, the first audio content corresponding to first language and the second audio content corresponding to a second language different from the first language.

17. The method of claim 15, further comprising:

determining, using the metadata, that the first audio content corresponds to a first language and the second audio content corresponds to a second language different from the first language; and receiving a user input representing a request to receive the media item in the second language, wherein the first request is sent in response to receiving the user input.

18. The method of claim 15, further comprising:

determining, using the metadata, that the first audio content corresponds to a first language and the second audio content corresponds to a second language different from the first language; and determining, using a stored user profile, a user preference to receive the media item in the second language, wherein the first request is sent automatically based on the user preference.

19. The method of claim 15, further comprising:

determining, using the metadata, timing information corresponding to transmission of the portions of the second audio data; and synchronizing a radio of the first device using the timing information.

20. The method of claim 15, further comprising:

periodically sending, from the first device over the second period of time, requests to receiving the second audio data.

* * * * *